United States Patent [19]
Dietz et al.

[11] Patent Number: 6,132,873
[45] Date of Patent: Oct. 17, 2000

[54] MULTILAYERED INTERFERENCE PIGMENTS

[75] Inventors: Johann Dietz, Dietzenbach; Manfred Parusel, Münster; Matthias Schilling, Alsbach; Klaus Ambrosius, Dieburg, all of Germany

[73] Assignee: Merck Patent Gesellschaft mit Beschrankter Haftung, Germany

[21] Appl. No.: 09/051,713

[22] PCT Filed: Sep. 6, 1997

[86] PCT No.: PCT/EP97/04850

§ 371 Date: Apr. 17, 1998

§ 102(e) Date: Apr. 17, 1998

[87] PCT Pub. No.: WO98/12266

PCT Pub. Date: Mar. 26, 1998

[30] Foreign Application Priority Data

Sep. 21, 1996 [DE] Germany ............ 196 38 706

[51] Int. Cl.⁷ .................................................. B32B 7/02
[52] U.S. Cl. ........................ 428/404; 428/403; 106/415
[58] Field of Search ............... 428/403, 404; 106/415

[56] References Cited

U.S. PATENT DOCUMENTS

| | | | |
|---|---|---|---|
| 4,867,793 | 9/1989 | Franz et al. | 106/415 |
| 5,302,199 | 4/1994 | Prengel et al. | 106/417 |
| 5,350,448 | 9/1994 | Dietz et al. | 106/441 |
| 5,958,125 | 9/1999 | Schmid et al. | 106/417 |

*Primary Examiner*—Bruce H. Hess
*Assistant Examiner*—Michael E. Grendzynski
*Attorney, Agent, or Firm*—Millen, White, Zelano, & Branigan, P.C.

[57] ABSTRACT

Multilayer interference pigments consisting of a transparent carrier material coated with alternating layers of metal oxides of low and high refractive index, the layers of the metal oxides of low refractive index being optically inactive.

The thickness of the metal oxide layers of high refractive index is an integral multiple of the optical thickness which is necessary for the desired interference color.

The layer thickness of metal oxide layers of low refractive index is from 1 to 20 nm.

15 Claims, No Drawings

MULTILAYERED INTERFERENCE PIGMENTS

The invention relates to multilayer interference pigments consisting of a transparent carrier material coated with alternating layers of metal oxides of low and high refractive index.

Multilayer interference pigments with alternating layers of materials of high and low refractive index are known. They differ in respect of the carrier material and of the material for the individual layers, and in the preparation process. The layers are prepared either by precipitation in a wet process or by vapour deposition or sputtering under vacuum. The layers applied to the carrier or to a release layer are all optically active and contribute to the development of the interference colours. The carrier materials are optically active only in exceptional cases.

U.S. Pat. No. 4,434,010 describes a multilayer interference pigment consisting of a central layer of a reflective material (aluminium) and alternating layers of two transparent, dielectric materials of high and low refractive index, for example titanium dioxide and silicon dioxide, on both sides of the central aluminium layer. This pigment is used for the printing of securities.

JP H7-759 (Kokoku) describes a multilayer interference pigment with a metallic lustre. It consists of a substrate coated with alternating layers of titanium dioxide and silicon dioxide. The substrate is formed from aluminium, gold or silver flakes or flakes of mica and glass coated with metals.

JP H7-246 366 describes a multilayer interference pigment with alternating layers of a material of high refractive index and a material of low refractive index. The substrate used is glass and, for the coating, silicon dioxide and titanium dioxide. The individual layers possess an optical thickness which is an integral multiple of a quarter of the wavelength at which interference is expected. This results, for the titanium dioxide layers, in a layer thickness of 44.4 nm at a refractive index of 2.7 and, for the silicon dioxide layers, in a layer thickness of 80 nm at a refractive index of 1.5.

In the pigments described above, the silicon dioxide layers act as optically active layers. This optically active effect begins with a layer thickness of about 20 nm. Silicon dioxide layers, however, are also employed as diffusion barriers in conductive pigments. For instance, EP 0 373 575 describes conductive platelet-form pigments consisting of a platelet-form metal oxide or of a platelet-form material coated with metal oxide, and a conductive layer, the metal oxide layer and conductive layer being separated by a silicon dioxide layer which prevents ions from the substrate or from the metal oxide layer diffusing into the conductive layer in the course of calcining; otherwise, the conductivity of the antimony-doped tin oxide layer is reduced. The thickness of the silicon dioxide interlayer is between 8 and 30 nm at concentrations of from 5 to 20% by weight of $SiO_2$ based on the substrate.

It has surprisingly been found that the quality of customary commercial interference pigments in respect of their mechanical properties can be markedly improved if, in the metal oxide layers of high refractive index, at least one interlayer of another metal oxide is arranged which possesses no optical activity.

A feature of appropriate metal oxides is that despite their low thickness they are obtained as a layer even after the calcining of the pigment, since they do not readily form mixed phases with the surrounding metal oxides of high refractive index. Moreover, they have a markedly lower refractive index than the metal oxides which form the optical layer.

The invention therefore provides multilayer interference pigments consisting of a carrier material coated with alternating layers of metal oxides of high and low refractive index, the layer(s) of the metal oxide of low refractive index being optically inactive.

The invention additionally provides a process for preparing the novel pigments, in which the transparent carrier material is suspended in water and coated in alternation with a metal oxide hydrate of high refractive index and a metal oxide hydrate of low refractive index by addition and hydrolysis of the corresponding water-soluble metal compounds, the pH necessary for the precipitation of the respective metal oxide hydrate being established and kept constant by simultaneous addition of acid or base, and then the coated carrier material is separated off from the aqueous suspension, dried, and if desired, calcined.

The invention provides, furthermore, for the use of the novel pigments for pigmenting paints, printing inks, plastics, glazes for ceramics and glass, as well as cosmetics.

For this purpose they can be employed as mixtures with customary commercial pigments, for example inorganic or organic absorbtion pigments, metal-effect pigments and LCP pigments.

The carrier material is mica, another phyllosilicate, glass flakes, or platelet-form silicon dioxide, which is prepared by the technique described in WO 93/08237 on a continuous belt by solidification and hydrolysis of a waterglass solution.

The metal oxide of high refractive index can be an oxide or mixtures of oxides with or without absorbing properties, such as $TiO_2$, $ZrO_2$, $Fe_2O_3$, $Fe_3O_4$, $Cr_2O_3$ or $ZnO$, or a compound of high refractive index such as, for example, iron titanates, iron oxide hydrates and titanium suboxides, or mixtures and/or mixed phases of these compounds with one another or with other metal oxides.

The metal oxide of low refractive index is $SiO_2$, $Al_2O_3$, $AlOOH$, $B_2O_3$ or a mixture thereof and can likewise have absorbing or non-absorbing properties. If desired, the oxide layer of low refractive index may include alkali metal oxides and alkaline earth metal oxides as constituents.

The metal oxide layers are preferably applied by a wet-chemical method, in which context it is possible to employ the wet-chemical coating techniques developed for the preparation of pearl lustre pigments; techniques of this kind are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017, or else in further patent documents and other publications.

For coating, the substrate particles are suspended in water, and one or more hydrolysable metal salts are added at a pH which is appropriate for hydrolysis and is chosen such that the metal oxides and/or metal oxide hydrates are precipitated directly onto the particles without any instances of secondary precipitation. The pH is kept constant usually by simultaneous metered addition of a base or alkali. The pigments are subsequently separated off, washed and dried and, if desired, calcined, the calcination temperature possibly being optimized in respect of the particular coating. If desired, following the application of individual coatings the pigments can be separated off, dried and, if desired, calcined before being resuspended for the application of further layers by precipitation.

Preferably, use is made of titanium dioxide as the metal oxide of high refractive index and of silicon dioxide as the metal oxide of low refractive index.

For the application of the titanium dioxide layers, preference is given to the technique described in U.S. Pat. No. 3,553,001.

An aqueous titanium salt solution is added slowly to a suspension, heated to about 50–100° C., in particular 70–80° C., of the material to be coated, and a substantially constant pH of about 0.5–5, in particular about 1.5–2.5, is maintained by simultaneous metered addition of a base, for example aqueous ammonia solution or aqueous alkali metal hydroxide solution. As soon as the desired layer thickness of the $TiO_2$ precipitation has been reached, the addition of the titanium salt solution and of the base is stopped.

This process, also termed the titration process, is notable for the fact that it avoids an excess of titanium salt. This is achieved by supplying to the hydrolysis only that quantity per unit time which is necessary for uniform coating with the hydrated $TiO_2$ and which can be received per unit time by the available surface area of the particles to be coated. There is therefore no production of hydrated titanium dioxide particles not precipitated on the surface to be coated.

For the application of the silicon dioxide layers, the following process is to be employed: a sodium silicate solution is metered into a suspension, heated to about 50–100° C., in particular 70–80° C., of the material to be coated. The pH is held constant at 1.5 to 10, preferably at 6.5 to 8.5, by simultaneous addition of 10% hydrochloric acid. Stirring is carried out for a further 30 minutes following addition of the silicate solution.

It is also possible to alter the powder colour of the pigment by applying further layers, for example coloured metal oxides or Prussian Blue, transition metal compounds, such as compounds of Fe, Cu, Ni, Co or Cr, for example, or organic compounds such as dyes or colour lakes.

It is additionally possible to subject the finished pigment to an aftercoating or aftertreatment process which further increases the stability to light, weather and chemicals, or which facilitates the handling of the pigment, especially its incorporation into different media. Suitable aftercoating and aftertreatment processes are those described, for example, in DE-C 22 15 191, DE-A 31 51 354, DE-A 32 35 017 or DE-A 33 34 598.

The substances additionally applied make up only about 0.1 to 5% by weight, preferably about 0.5 to 3% by weight, of the overall pigment.

Preference is also given to an additional coating with complex salt pigments, especially cyanoferrate complexes, for example Prussian Blue and Turnbull's Blue, as is described in EP 0 141 173 and DE 23 13 332.

The novel pigment can also be coated with organic dyes and, in particular, with phthalocyanine or metal phthalocyanine and/or indanthrene dyes in accordance with DE 40 09 567. This is done by preparing a suspension of the pigment in a solution of the dye and then bringing this suspension together with a solvent in which the dye is of low or zero solubility.

The thickness of the interlayers of metal oxides of low refractive index within a metal oxide layer of high refractive index is from 1 to 20 nm, preferably from 2 to 10 nm. Within this range, a metal oxide layer of low refractive index, for example silicon dioxide, is optically inactive, which is an essential feature of the present invention.

The thickness of the layers of metal oxides of high refractive index is between 20 and 350 nm, preferably between 40 and 260 nm. Since the interlayers of low-refractive-index metal oxides greatly increase the mechanical stability of the layers of high-refractive-index metal oxides, it is also possible to prepare thicker layers of adequate stability. In practice, however, layer thicknesses of only up to 260 nm are employed, which in the case of a titanium dioxide-mica pigment corresponds to IIIrd-order green.

The number and thickness of the interlayers is dependent on the total layer thickness of the metal oxide layer of high refractive index. The interlayer is preferably arranged such that the layer thickness of the metal oxide layers of high refractive index corresponds to the optical thickness, or to an integral multiple of this optical thickness, which is necessary for the respective interference colour. For example, for a IIIrd-order green the interlayers would be arranged such that one layer is located at Ist-order green and a second layer at IInd-order green. This is valid for pure interference colours. In a different case, the skilled worker can determine the optimum position of the interlayers without any inventive exertion. For example, a more yellow IIIrd-order green is obtained if the interlayer is placed towards IInd-order gold, compared with a pure IIIrd-order green in which the interlayer is arranged on a IInd-order green.

FIG. 1 shows the colour curve for the preparation of a titanium dioxide-mica pigment with the interference colour IInd-order red without an $SiO_2$ interlayer (dashed curve) compared with pigments prepared under the same conditions but possessing an $SiO_2$ interlayer at 40 nm (silver-black curve), at 120 nm (Ist-order red-red curve) and at 180 nm (IInd-order green-green curve). From FIG. 1 it is evident that the position of the interlayer influences the course of the interference-related colouristic curve. A skilled worker is able readily, by altering the layer thickness, to prepare a pigment with the same colour corresponding to the dashed curve. This colour shift plays no part in practice, since the end point of the coating is determined not by a defined layer thickness but by the desired colour. In the case of improvements made to pigments already on the market, for example interference pigments, which are marketed under the trade name Iriodin® by Merck KG, it is therefore necessary when incorporating interlayers to make slight adjustments to the standard conditions for the preparation, in order to optimize them.

The incorporation of the abovementioned interlayers of a low-refractive-index metal oxide, for example silicon dioxide, brings about a marked improvement in the mechanical stability of interference pigments prepared by a wet-chemical route. Instances of cracking, which can occur very easily in the course of calcining, are very largely avoided. By this means, brighter colours, and colours of greater intensity, are obtained.

EXAMPLE 100 g of potassium mica (10–60 μm) are suspended in 2 l of deionized water. The suspension is heated to 75° C., adjusted to a pH of 1.8 with dilute hydrochloric acid, first of all coated with $SnO_2$ by adding 3.3 ml/min of $SnCl_4$ solution (from 2.2 g of $SnCl_4$ and 0.75 g of conc. hydrochloric acid in 100 ml of deionized water). The pH is held constant using 32% sodium hydroxide solution.

Stirring is continued for 15 minutes and then coating with $TiO_2$ is carried out under the same pH/temperature conditions by adding 1.5 ml/min of $TiCl_4$ solution (400 g of $TiCl_4$/l) and holding the pH constant with 32% sodium hydroxide solution. Coating is interrupted after the IInd-order green end point is reached, stirring is continued for 15 minutes, the pH is adjusted to 8.0 with dilute sodium hydroxide solution (over the course of about 15 minutes), and then stirring is continued for 10 minutes more.

Coating with $SiO_2$ is then carried out by adding 3 ml/min of sodium silicate solution (from 7.3 g of sodium silicate with 27% $SiO_2$ and 80 ml of deionized water) without pH compensation. Afterwards, stirring is continued for 15 minutes, the pH is readjusted to 1.8 with dilute hydrochloric acid (over the course of about 10 minutes), and a second TiO$_2$ layer is applied as described above by adding TiCl$_4$ solution. Coating is interrupted after the IIIrd-order green comparison end point has been reached, stirring is continued for 15 minutes, and then the pigment is filtered off with suction, washed, dried and calcined at 850° C. for 30 minutes.

The pigment obtained has an intense green interference colour. The division of the TiO$_2$ layers is as follows:

| | |
|---|---|
| 1st layer: | about 170 nm |
| 2nd layer: | about 85 nm |
| Total layer: | about 260 nm. |

The thickness of the SiO$_2$ interlayer is about 5 nm.

Comparison Example 100 g of potassium mica (10–60 µm) are suspended in 2 l of deionized water. The suspension is heated to 75° C., adjusted to a pH of 1.8 with dilute hydrochloric acid, first of all coated with SnO$_2$ by adding 3.3 ml/min of SnCl$_4$ solution (from 2.2 g of SnCl$_4$ and 0.75 g of conc. hydrochloric acid in 100 ml of deionized water). The pH is held constant using 32% sodium hydroxide solution.

Stirring is continued for 15 minutes and then coating with TiO$_2$ is carried out under the same pH/temperature conditions by adding 1.5 ml/min of TiCl$_4$ solution (400 g of TiCl$_4$/l) and holding the pH constant with 32% sodium hydroxide solution. Coating is interrupted after the IIIrd-order green end point has been reached, stirring is continued for 15 minutes, and then the pigment is filtered off with suction, washed, dried and calcined at 850° C. for 30 minutes. The thickness of the TiO$_2$ layer is about 255 nm. The pigment obtained is much weaker in the strength of the interference colour than the pigment prepared in accordance with the invention. The platelets show severe cracks and instances of flaking in the TiO$_2$ layer.

Colour characteristics of the resulting pigments (Hunter—L, a, b) on the basis of nitrocellulose coating cards NC coating cards are prepared by carefully dispersing 0.9 g of pigment in 54.5 g of NC varnish, devolatilizing the mixture, and then applying it with the aid of a doctor blade to a card having a half-black and half-white substrate. The wet film thickness is 500 µm. After drying, the colour data are measured under the stated geometries.

| | Geometry | | | | | | | |
|---|---|---|---|---|---|---|---|---|
| | 45°/0° Black card | | | 22.5°/22.5° Black card | | | 45°/0° Black card | |
| | L | a | b | L | a | b | L | a | b |
| Example | 28.6 | −6.4 | −4.0 | 63.5 | −28.3 | +5.7 | 83.0 | +11.5 | −0.8 |
| Comparison Example | 28.4 | −5.3 | −3.7 | 55.9 | −21.3 | +5.9 | 85.4 | +7.9 | |

The advantages of the pigment according to the invention relative to the comparison example are very evident:
Colour strength, represented by the negative a value gloss (22.5°/22.5°):
28.3 as against 21.3
Luminance, represented by the C value gloss (22.5°/22.5°):
63.5 as against 55.9
Gloss, represented by the "gloss number"

$$\left( \frac{L_{22.5°/22.5°} - L_{45°/0°}}{L_{22.5°/22.5°}} \right):$$

55.0 as against 49.2

What is claimed is:

1. A multilayer interference pigment comprising a carrier material of mica, another phyllosilicate, glass flakes, or platelet-form silicon dioxide coated with layers of metal oxides, wherein the layers of metal oxides comprise two layers of metal oxides of high refractive index with an interlayer therebetween of a metal oxide of low refractive index wherein the interlayer has a thickness of from 1 to less than 20 µm.

2. The multilayer interference pigment of claim 1, wherein the interlayer has a layer thickness of from 2 to 10 nm.

3. The multilayer interference pigment of claim 1, wherein the layers of metal oxides of high refractive index on either side of the interlayer have a layer thickness which is an integral multiple of the optical thickness necessary for a selected interference color.

4. The multilayer interference pigment of claim 1, wherein the interlayer of a metal oxide of low refractive index is of SiO$_2$, Al$_2$O$_3$, AlOOH, B$_2$O$_3$ or mixtures thereof.

5. The multilayer interference pigment of claim 1, wherein the interlayer of a metal oxide of low refractive index is of SiO$_2$.

6. The multilayer interference pigment of claim 1, wherein the two layers of metal oxides of high refractive index on either side of the interlayer comprise TiO$_2$, ZrO$_2$, Fe$_2$O$_3$, Fe$_3$O$_4$, Cr$_2$O$_3$, ZnO, an iron titanate, an iron oxide hydrate, a titanium suboxide or mixtures thereof.

7. The multilayer interference pigment of claim 1, wherein the two layers of metal oxides of high refractive index on either side of the interlayer are of TiO$_2$.

8. The multilayer interference pigment of claim 1, wherein the two layers of metal oxides of high refractive index on either side of the interlayer are of TiO$_2$ and the interlayer is of SiO$_2$.

9. The multilayer interference pigment of claim 1, wherein pigment consists essentially of the transparent carrier layer and coated thereon, two layers of TiO$_2$ metal oxides of high refractive index on either side of an interlayer of SiO$_2$.

10. The multilayer interference pigment of claim 1, wherein, in addition to the interlayer of a metal oxide of low refractive index and the two layers of metal oxides of high refractive index on either side of the interlayer, the pigment further comprises a layer of another of a colored metal oxide, complex salt pigment, a transition metal compound or an organic dye or color lake.

11. The multilayer interference pigment of claim 1, wherein the layers of metal oxides of high refractive index each have a layer thickness of from 20 to 350 nm.

12. The multilayer interference pigment of claim 1, wherein the layers of metal oxides of high refractive index each have a layer thickness of from 40 to 260 nm.

13. The multilayer interference pigment of claim 1, wherein the overall thickness of the metal oxide layers of high refractive index is divided optically by the interlayer of low refractive index into individual layers of the same $1^{st}$ or $2^{nd}$ order interference color.

14. A paint, printing ink, plastic, cosmetic or ceramic or glass glaze composition, which comprises a multilayer interference pigment according to claim 1.

15. A paint, printing ink, plastic, cosmetic or ceramic or glass glaze composition, which comprises a multilayer interference pigment according to claim 8.

* * * * *